US008108007B1

(12) United States Patent
Wick et al.

(10) Patent No.: US 8,108,007 B1
(45) Date of Patent: Jan. 31, 2012

(54) DISPLAYING DIRECTORY INFORMATION ON A HANDSET WITHOUT SIMULTANEOUS DATA AND VOICE (75) Inventors: Ryan A. Wick, Apollo Beach, FL (US); Raymond E. Reeves, Olathe, KS (US); Nathan A. Smith, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 277 days.

(21) Appl. No.: 12/554,273

(22) Filed: Sep. 4, 2009

(51) Int. Cl.
 *H04B 1/38* (2006.01)
(52) U.S. Cl. ........................ 455/566; 455/415
(58) Field of Classification Search .............. 455/566, 455/417, 418, 459–462, 555, 554.1, 554.2, 455/426.1, 426.2, 415; 379/211.01, 211.02, 379/212.01, 218.01, 219–241, 120, 142.01–142.18, 379/245–249; 709/228–244
See application file for complete search history.

(56) References Cited

U.S. PATENT DOCUMENTS

| | | | |
|---|---|---|---|
| 6,731,735 B1 * | 5/2004 | Cook | 379/207.11 |
| 6,782,081 B2 * | 8/2004 | Malik | 379/93.24 |
| 6,870,921 B1 * | 3/2005 | Elsey et al. | 379/218.01 |
| 7,085,257 B1 * | 8/2006 | Karves et al. | 370/352 |
| 7,480,723 B2 | 1/2009 | Grabelsky et al. | |
| 2005/0197110 A1 * | 9/2005 | Hasan et al. | 455/417 |

* cited by examiner

*Primary Examiner* — Kent Chang
*Assistant Examiner* — San Htun (57) ABSTRACT

Directory information is displayed on a mobile handset of a user when a dialed telephone number is a directory-capable number. A directory processor receives the dialed telephone number and checks whether the dialed telephone number appears in a database of directory-capable telephone numbers. A gateway pushes a data message including a data address of a directory server to the mobile handset. The directory server stores directory information for a plurality of call destinations with respective destination identifiers and respective access rules. A client application in the mobile handset responds to the data message. The directory server identifies relevant directory information based on the dialed telephone number and transmits it to the client application via the data call. The client application displays the relevant directory information and the user selects a call destination.

15 Claims, 8 Drawing Sheets

DISPLAYING DIRECTORY INFORMATION ON A HANDSET WITHOUT SIMULTANEOUS DATA AND VOICE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to displaying a phone directory on a mobile handset when dialing an enterprise such as a business, institutional, governmental or other enterprise organization, and, more specifically, to presenting an organizational directory to a mobile handset when the wireless network and/or handset are not capable of simultaneous voice and data communications.

A typical business or other organizational enterprise (e.g., a governmental or educational entity) may have many members or employees of the organization who are reachable by respective telephone extensions. An enterprise system may use a public branch exchange (PBX) that includes a main telephone number associated with a central system wherein the central system interacts with callers and redirects calls to appropriate destinations within the PBX. The interface function is typically automated using an interactive voice response (IVR) unit that plays audio prompts and collects responses from the caller. The prompts typically follow a menu structure that is navigated by the caller by speaking various commands or by pressing keypad buttons on the telephone device to produce the commands as DTMF tones.

A typical person has an easier time remembering the name of a person they want to call rather than an extension number of that person. Systems are known wherein an IVR menu provides access to the names of people available at an enterprise, such as by entering the first few letters of their name using the keypad and then providing prompts to confirm the selection. However, such systems can be cumbersome and are not helpful when the caller can remember neither the person's name nor their extension number. Furthermore, prior systems have been adaptable to take into account the actual availability of the callee or to provide the call recipients with any control over which callers can gain access to their extensions. Thus, it would be desirable to provide an improved directory system for providing contact information when a caller calls into a business or other enterprise exchange.

Commonly assigned co-pending application U.S. Ser. No. 12/412,813, filed Mar. 27, 2009, entitled "Displaying Business Directory Information On A Mobile Handset", which is incorporated herein by reference in its entirety, discloses a system and methods for communicating the directory information to a mobile handset that may work most effectively in a carrier network that allows simultaneous voice and data communication. However, many existing mobile wireless networks (including CDMA, iDEN, and GSM) may not support simultaneous voice and data communication, and some handsets may also be incapable of such simultaneous voice and data channels, thereby making the combined voice and data functions of the directory service more challenging. The present invention supports an integrated voice and data user experience for receiving an enterprise directory on a network which does not support simultaneous voice and data.

SUMMARY OF THE INVENTION

In one aspect of the invention, a system is provided for displaying directory information on a mobile handset of a user, wherein the mobile handset engages in voice calls and data calls via a carrier network. The system comprises a database of directory-capable telephone numbers. A directory processor is coupled within the carrier network to receive a dialed telephone number when the user initiates a voice call from the mobile handset, wherein the directory processor checks whether the dialed telephone number appears in the database of directory-capable telephone numbers. A gateway is coupled to the directory processor for pushing a data message to the mobile handset. A directory server has a data address that is included in the data message to the mobile handset, wherein the directory server stores directory information for a plurality of call destinations with respective destination identifiers and respective access rules corresponding to the directory-capable telephone numbers. A client application is provided in the mobile handset responsive to the data message pushed to the mobile handset for sending a request to the directory server via a data call, wherein the request identifies the dialed telephone number. The directory server identifies relevant directory information based on the dialed telephone number and transmits the relevant directory information to the client application via the data call. The client application displays the relevant directory information and the user selects a call destination. The data call is terminated and a new voice call is established between the mobile handset and the selected call destination.

DETAILED DESCRIPTION OF PREFERRED EMBODIMENTS

When the user of a wireless mobile handset (such as a CDMA phone) calls a business or other enterprise wherein calls to a main exchange are distributed to a plurality of call destinations within the enterprise, the present invention temporarily makes available a directory of relevant call destinations of the business on the wireless handset. Instead of being prompted to dial the extension of the person to whom the caller wishes to speak, she can open the provided contact list and select the name of the person or the department desired. The invention further allows the business or the identified persons within the business to control the circumstances under which particular call destinations will be included in the directory supplied to the caller based on such factors as the phone number of the caller and the location of the caller.

In order to operate without the capability for simultaneous voice and data communication, the invention employs modifications to the switch in the carrier network. To briefly summarize the operation of the invention, the switch routes designated numbers within an incoming voice call which are considered to be a directory-capable number to a directory processor instead of following normal routing (which in most cases would be routed to the PSTN and then to the called number at the business or other enterprise). Thus, the directory processor looks up the phone number in a data store to ensure it is a directory-capable number and to retrieve a corresponding directory server locator (such as an IP address, URL, or SIP address). If the dialed phone number is configured in the directory processor, then the voice call is terminated. Prior to ending the voice call, an audio clip may be played to provide feedback to the user that an interactive directory experience is starting. Thus, the directory process is launched without the voice call having left the carrier network.

After ending the voice channel, a PUSH message is originated to the mobile station from the directory processor using the appropriate push technology for the particular network, such as an SMS or UDP message. The payload of the push message will include at least the directory server address information.

The mobile station has a client application program to receive the push message. The client can be a Java, BREW, or browser application, for example. Upon receiving the push message, the client will start (if not already running) and bring itself to the foreground. The client will parse the push message and retrieve the directory server information.

The client connects to the directory server using an appropriate protocol, such as HTTP, TCP, or UDP. The messages exchanged between the client and server may be text based markups such as XML or HTML. The messages exchanged between client and server include at least directory information such as name and phone number, and can also include instructions on how to present the data to the user (for example, in HTML markup).

Once the user selects a directory entry for the person they wish to call, the data connection is terminated and a new voice call is made to the selected entry. The user could optionally store this number directly to their contact list on the mobile station for future use.

Figure 1:
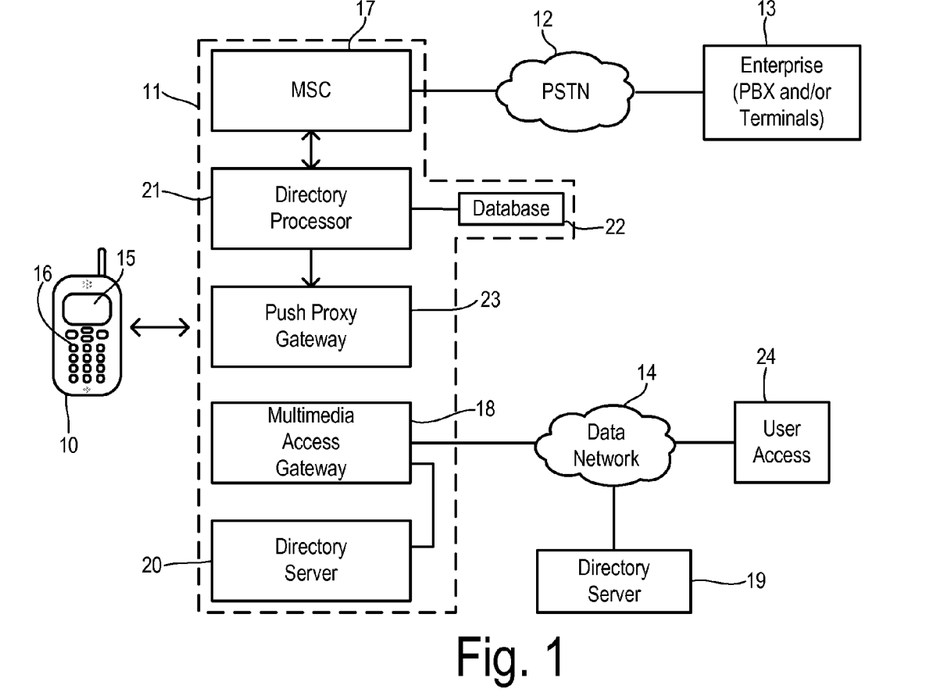
FIG. 1 is a block diagram showing one representative embodiment of a network system for the present invention.

Referring now to FIG. 1, a mobile handset 10 is wirelessly coupled to a carrier network 11, such as a CDMA-based network. A voice network 12 (such as a public switched telephone network) connects carrier network 11 to an enterprise system 13 which may be a PBX or a collection of separately accessible voice terminals. Carrier network 11 is further coupled to a data network 14 (such as the Internet). Mobile handset 10 can send and receive both voice and data signals non-simultaneously. It includes a graphical display 15 and a keypad 16.

Carrier network 11 includes a mobile switching center (MSC) 17 to establish voice calls from mobile handset 10 through voice network 12 to destinations in enterprise system 13. As used herein, enterprise means any business, governmental, institutional, educational, or other group dealing with the public and having or appearing to have a common phone system.

Carrier network 11 further includes a multimedia access gateway 18 for providing data connections between mobile handset 10 and data network 14, wherein the data connections can be made to other remote data entities such as a directory server 19 via network 14 or a directory server 20 in carrier network 11. Only one directory server 19 or 20 is necessary for the invention, but either or both could be used. MSC 17 is coupled to a directory processor 21 that has a database 22 for identifying directory-capable telephone numbers for which a directory can be obtained from directory server 20 or 19. Directory processor 21 communicates with a push proxy gateway 23 in carrier network 11 to establish a data connection with mobile handset 10 as described in greater detail below. Directory server 19 or 20 is configured to provide the customized directory information to be transferred over the data connection to the mobile handset in appropriate circumstances. Configuration of the directory database in the directory server may be performed by users for their individual records via a user access terminal 24 connected to data network 13. Thus, a business employee can connect their personal computer to directory server 20 or 19 in order to remotely configure access rules that determine what directory information, if any, will be sent to the calling party at particular times and under specific circumstances.

Figure 2:
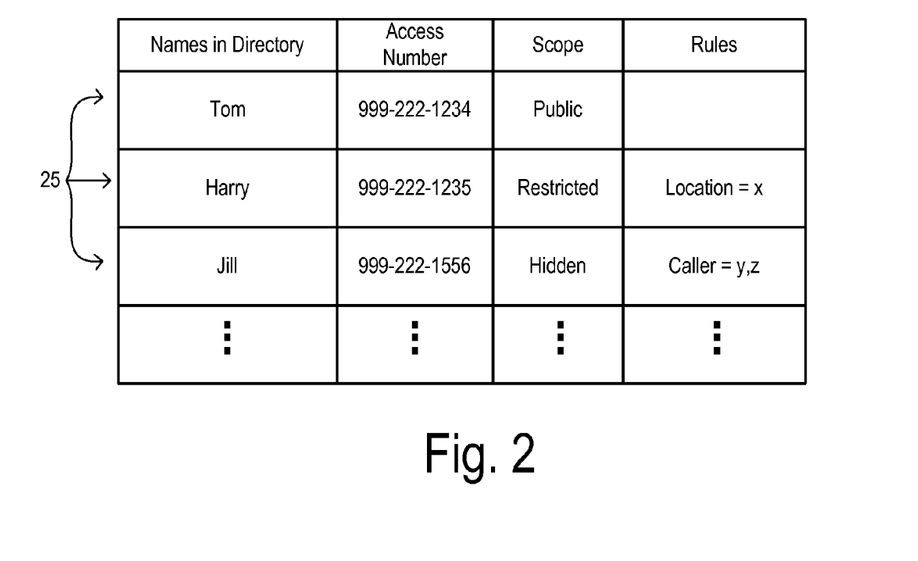
FIG. 2 is a data table showing an example of a directory database.

Example contents of a directory database accessed by directory server 19 or 20 are shown in FIG. 2 which is organized as a plurality of call destination records 25. Preferably, each record includes a directory name such as the name of a person (e.g., Tom, Harry, or Joe) or a function or department (e.g., accounting, service, or receptionist). Each record includes an access identifier (such as a telephone number, extension, or special dialing instructions) for each call destination name which may act as call set-up information when a voice call is subsequently completed to the corresponding call destination. The records further include access rules that may be queried by the directory server to determine relevant contact information that should be included in the data to be returned to any particular caller. The access rules may take the form of a scope or a filter, for example. A "scope" access rule may include a public scope wherein the associated call destination (with the name and destination identifier) is provided with every directory transfer to a caller (i.e., it is always relevant). Other scopes include records which may be restricted or hidden according to the application of various filters. Any particular scope may also include certain time blocks for which it is valid. In other words, a particular contact may be public at certain times and restricted at other times.

A "filter" access rule may include the location of the caller as determined from the user data obtained from the mobile handset. For example, the handset client application may monitor its location to determine a city where it is presently located. The access filter defines a relevant location as a city designated "x". If the cities match, then the record is relevant and the contact information of that person is included in the directory data sent to the client application. Another filter may be based on the actual identity of the caller as determined by the caller's phone number or from other information stored in the mobile handset. The filter defines the identities of callers who would be allowed to see the hidden contact. Such a "white list" of accepted callers to the hidden contact may also include time blocks during which the white list status is valid and other time blocks during which the contact will not be shown to the caller.

Figure 3:
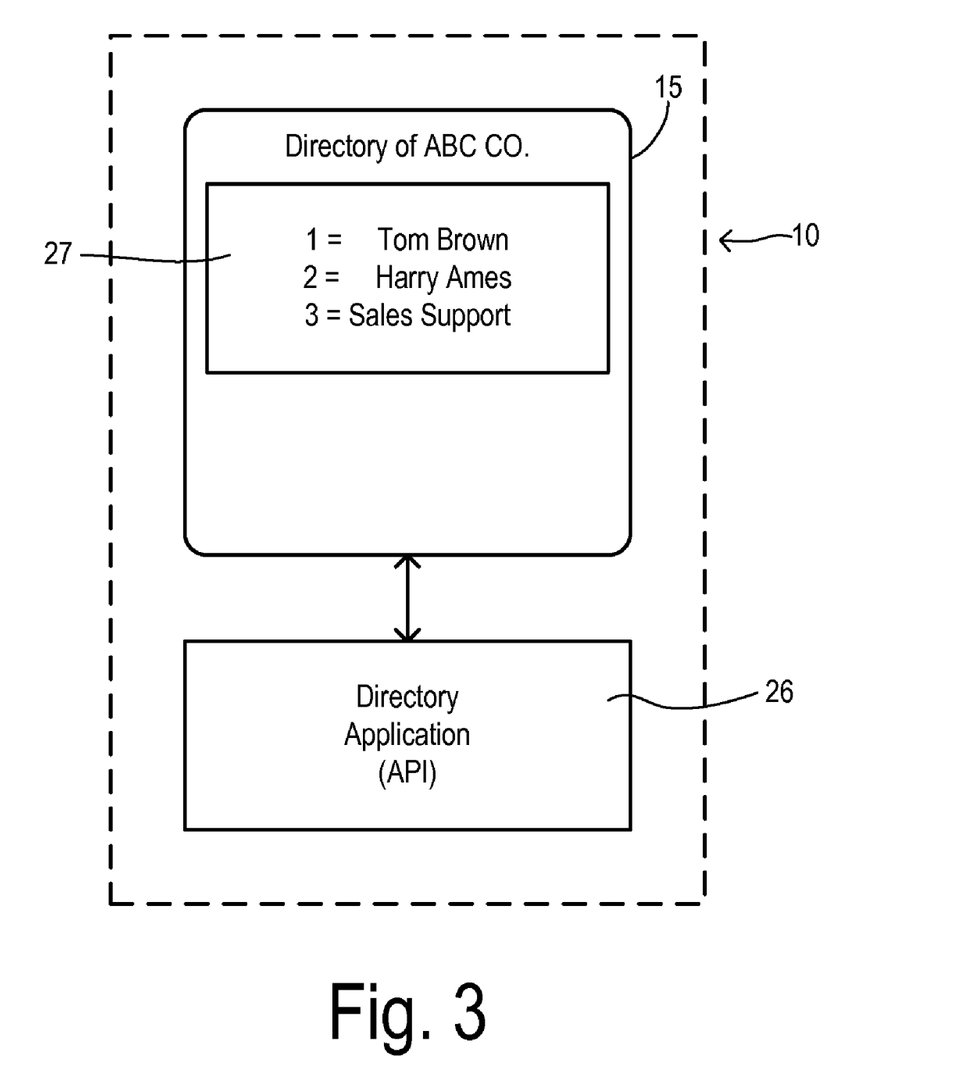
FIG. 3 shows a mobile handset.

Once relevant information is extracted from the directory server based on a query from the directory manager, it is returned to mobile handset 10 and displayed as shown in FIG. 3. The relevant directory information is transmitted to a directory application 26 such as an application program interface (API) which formats the name portion of the directory information and displays a directory selection menu 27 on display 15. For example, each name in the directory may be assigned to a respective key on the keypad so that the user may press a corresponding key, causing the directory application to capture the key press. The identified call destination is then used in order to complete a corresponding voice call as described in greater detail below.

Figure 4:
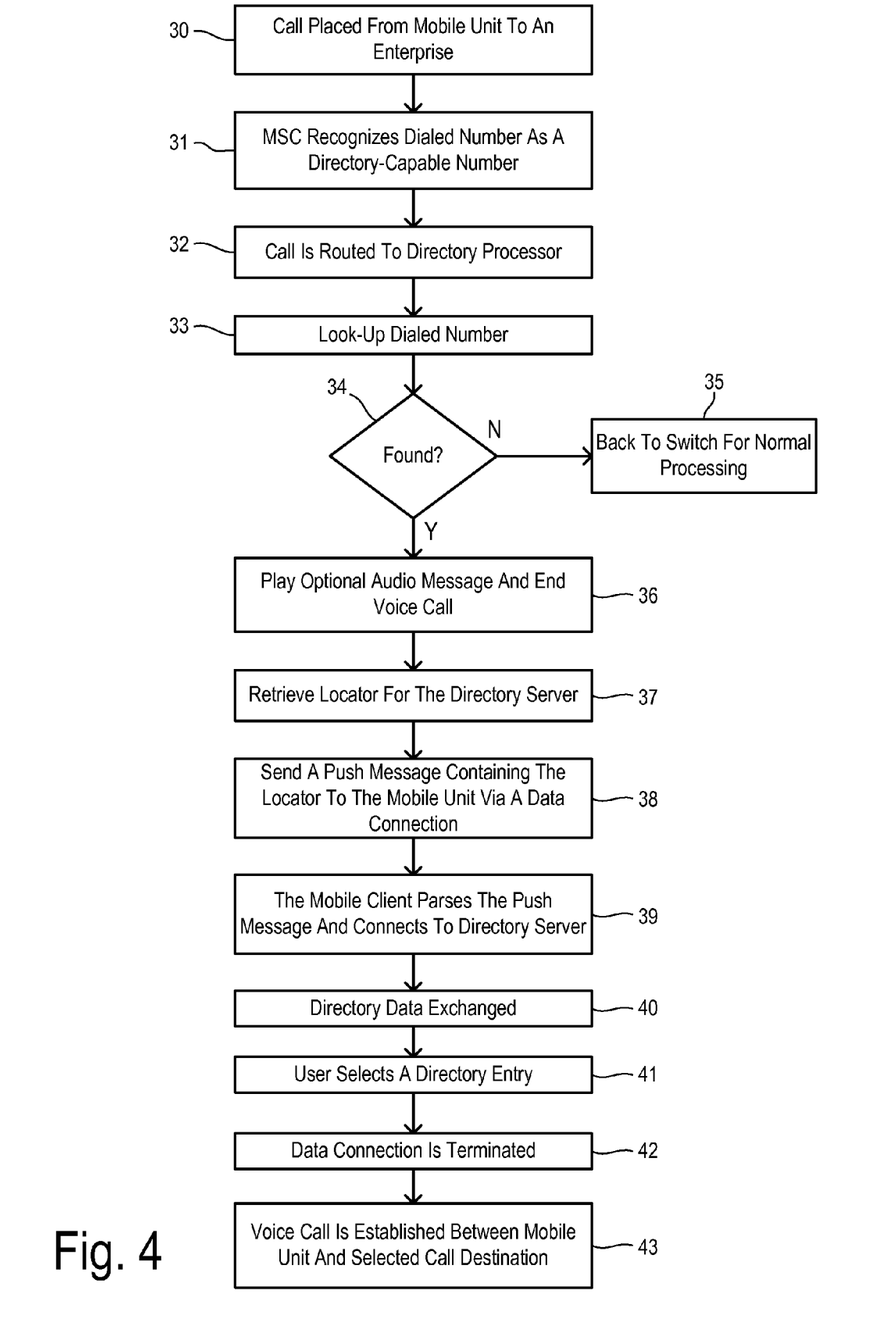
FIG. 4 is a flowchart of one preferred embodiment of a method of the present invention.

One preferred embodiment of a method of the present invention is shown in FIG. 4. In step 30, a call is placed from the mobile handset to an enterprise. In step 31, the switch recognizes the dialed telephone number as potentially being directory-capable (although this is optional, and all calls could be treated as potentially having a corresponding directory). Recognition by the switch may be based on a partial database of telephone numbers or exchanges to which the directory service applies, for example. The call is routed to the directory processor in step 32 so that the dialed telephone number can be looked up in step 33 against a database of the actual directory-capable telephone numbers. If the dialed telephone number is not found in step 34, then the call is routed back to the switch in step 35 for normal processing (i.e., continuing to set up a call to the dialed telephone number). If the dialed number is found in step 34, then an optional audio message may be played in step 36 to inform the calling party that the directory function is being launched, and the voice call is then ended so that a data call can be performed. In step 37, the directory processor retrieves the data network address or other locator for the directory server that corresponds to the dialed telephone number. A push message is sent to the mobile handset in step 38 containing the locator via the data connection created by the push proxy gateway. In step 39, the mobile client application parses the push message to obtain the locator address and then connects to the directory server via the data connection.

Once the data connection is made between the mobile handset and the directory server, directory data is exchanged in step 40. In step 41, the user selects a directory entry. Dialing information corresponding to the selected call destination is captured in the device that will orchestrate the establishment of a voice call, as described in greater detail below. In step 42, the data connection is terminated, and then a new voice call is established in step 43 between the mobile handset and the selected call destination.

Figure 5:
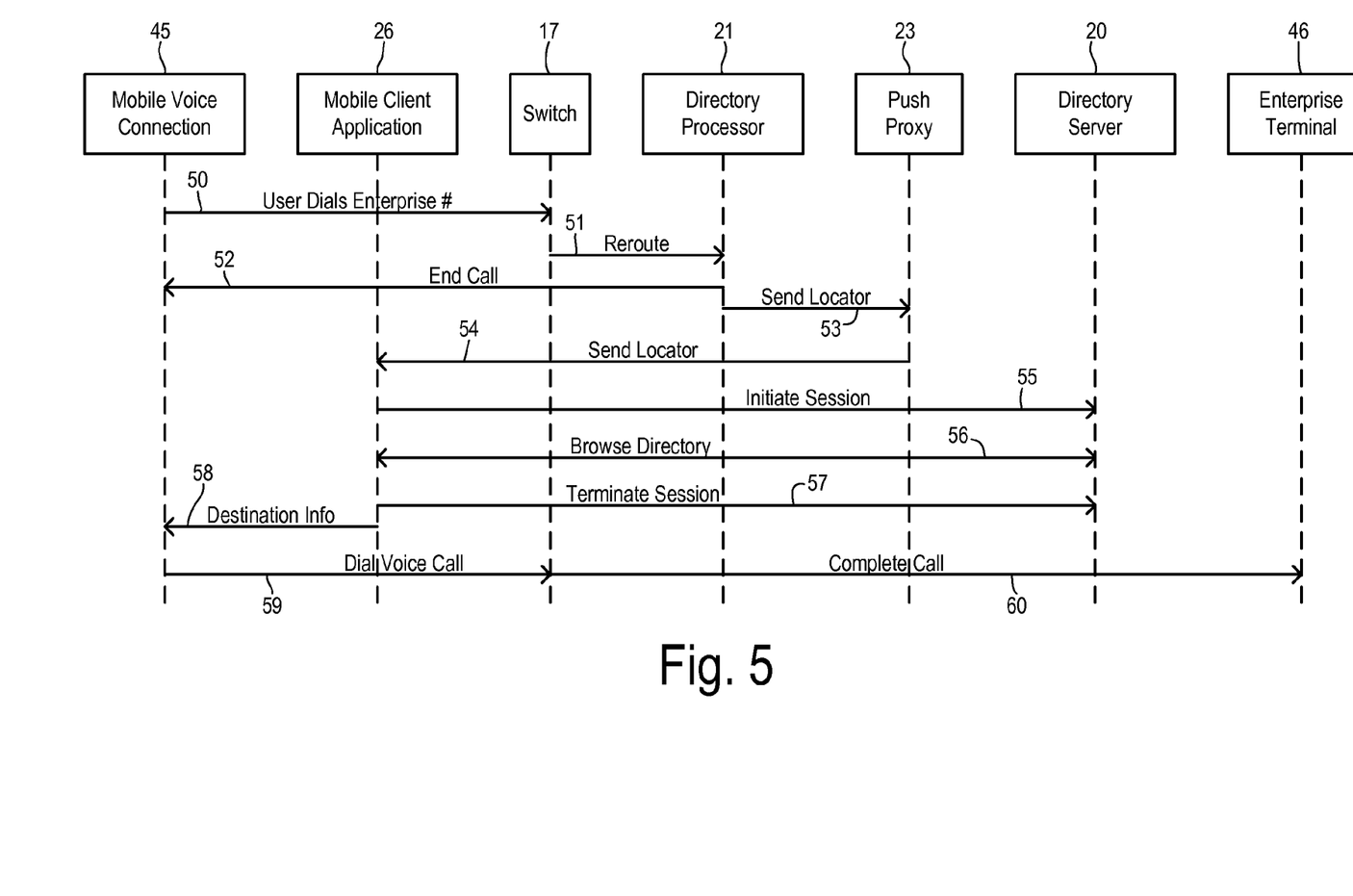
FIG. 5 is a signaling diagram showing a first preferred embodiment of the invention.

A more detailed signal flow for a first embodiment of the invention is shown in FIG. 5. Transactions occur between the separate entities comprising the mobile handset voice connection 45, mobile client application 26, switch 17, directory processor 21, push proxy 23, directory server 20, and an enterprise terminal or other call destination 46. In transaction 50, the user dials a directory-capable enterprise telephone number from the mobile handset. Call setup information is directed to switch 17. Switch 17 checks its database of potentially directory-capable telephone numbers and recognizes the dialed telephone number as being potentially directory capable, so it reroutes processing of the call to directory processor 21 in transaction 51. After directory processor 21 verifies the directory-capability of the dialed telephone number, it terminates the voice call in transaction 52 by sending a call termination signal. In transaction 53, directory processor 21 sends the locator (i.e., data network address of the directory server) associated with the dialed telephone number to push proxy gateway 23. Push proxy gateway 23 pushes a data message to mobile client application 26 by sending a data message that opens a socket for a data session (i.e., data call). In response to the pushed message containing the locator, mobile client application 26 opens a data session with directory server 20 in transaction 55. With an open session between mobile client application 26 and directory server 20, a series of mutual transactions 56 occur in which the user browses the directory information. As described in U.S. application Ser. No. 12/412,813, the directory server stores directory information for a plurality of call destinations with respective destination identifiers and respective access rules corresponding to the directory-capable telephone numbers. The directory server identifies relevant directory information based on the dialed telephone number and other information such as the access rules for certain call destinations in the enterprise and the telephone number or location of the calling party. The directory server transmits the relevant directory information to the client application via the data call and the relevant directory information is then displayed to the user.

According to the first embodiment shown in FIG. 5, when the user selects a desired call destination from within the directory information, the appropriate dialing information is transferred to mobile client application 26 as a transaction 56. Upon making the selection, mobile client 26 terminates the data session (i.e., data call) with directory server 20 in transaction 57. In this first embodiment, the new voice call that is placed to the selected destination is initiated by the mobile handset. Thus, the destination information (i.e., dialing instructions) is provided to the mobile voice connection 45 in transaction 58. A dialer in the mobile handset uses the destination information to initiate a newly dialed voice call in transaction 59. In response to the dialing, switch 17 completes a call to enterprise terminal 46 in transaction 60.

In the newly dialed call, a totally new telephone number, different than the originally dialed directory-capable number, may be used. The new telephone number is preferably one that is not recognized as being directory-capable by switch 17 or directory processor 21 so that the new voice call is completed as a normal call. In an alternative embodiment, the destination information may be comprised of the original directory-capable telephone number with additional dialing instructions appended. The appended dialing instructions include known functions such as pause, wait, or an extension number. The appended instructions are used by the carrier network in the call setup to reach a desired extension at the business enterprise. However, it is necessary for switch 17 to recognize the presence of the additional dialing instructions so that it routes the call to the PSTN instead of to the directory processor. Furthermore, so that the appended dialing instructions are not interpreted or executed by the dialer in the mobile handset (e.g., to ensure that the mobile handset dialer does not pause when the network dialing instructions include a pause), a unique command set comprising alternate function identifiers must be employed. The alternate commands would include the same functions but these would have different identifiers.

Figure 6:
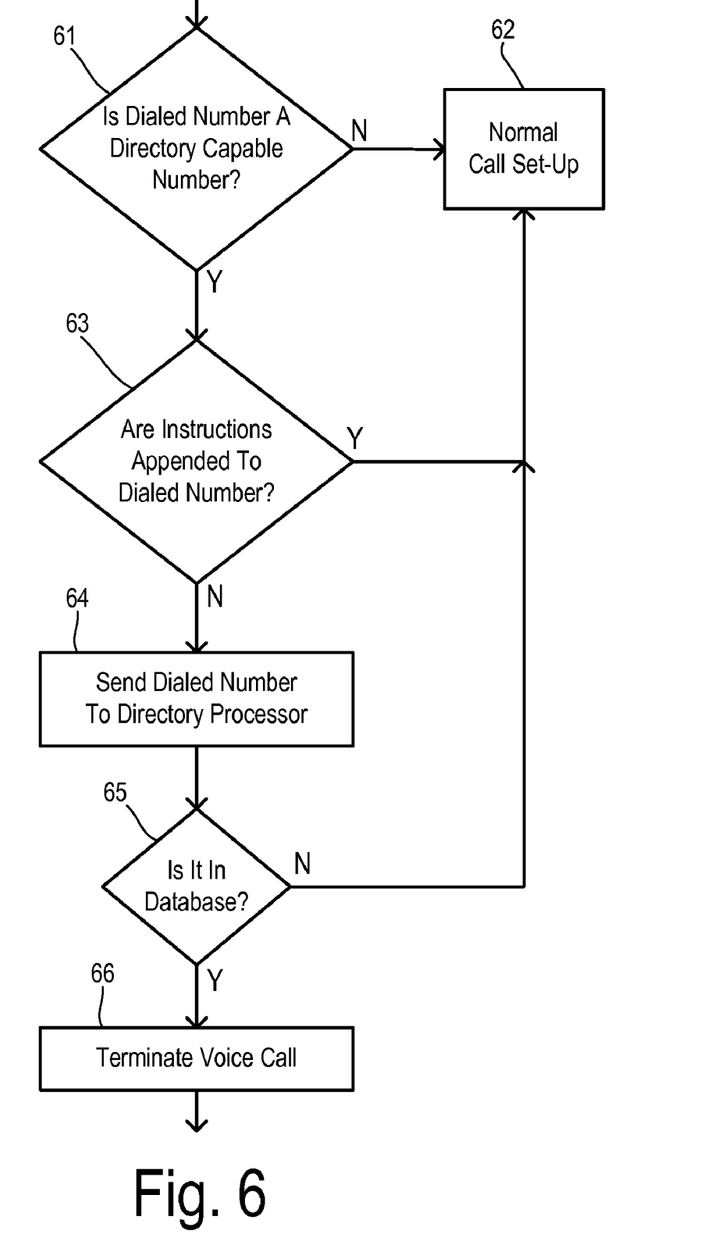
FIG. 6 is a flowchart of a preferred method performed by the directory processor.

A method for distinguishing between a dialed number with or without appended dialing instructions is shown in FIG. 6. In step 61, the switch checks whether the dialed number is a potentially directory-capable number. If not, then normal call setup is performed in step 62. If potentially a directory-capable number, the switch checks in step 63 to determine whether any instructions are appended to the dialed number. If so, then normal call setup is performed in step 62. Otherwise, the dialed number and the voice call are transferred to the directory processor in step 64. The directory processor checks in step 65 to determine whether the dialed number is in its database. If not, then the call is transferred back to the switch and normal call setup is performed in step 62. Otherwise, the voice call is terminated in step 66 and the method would return to step 36 in FIG. 4.

Figure 7:
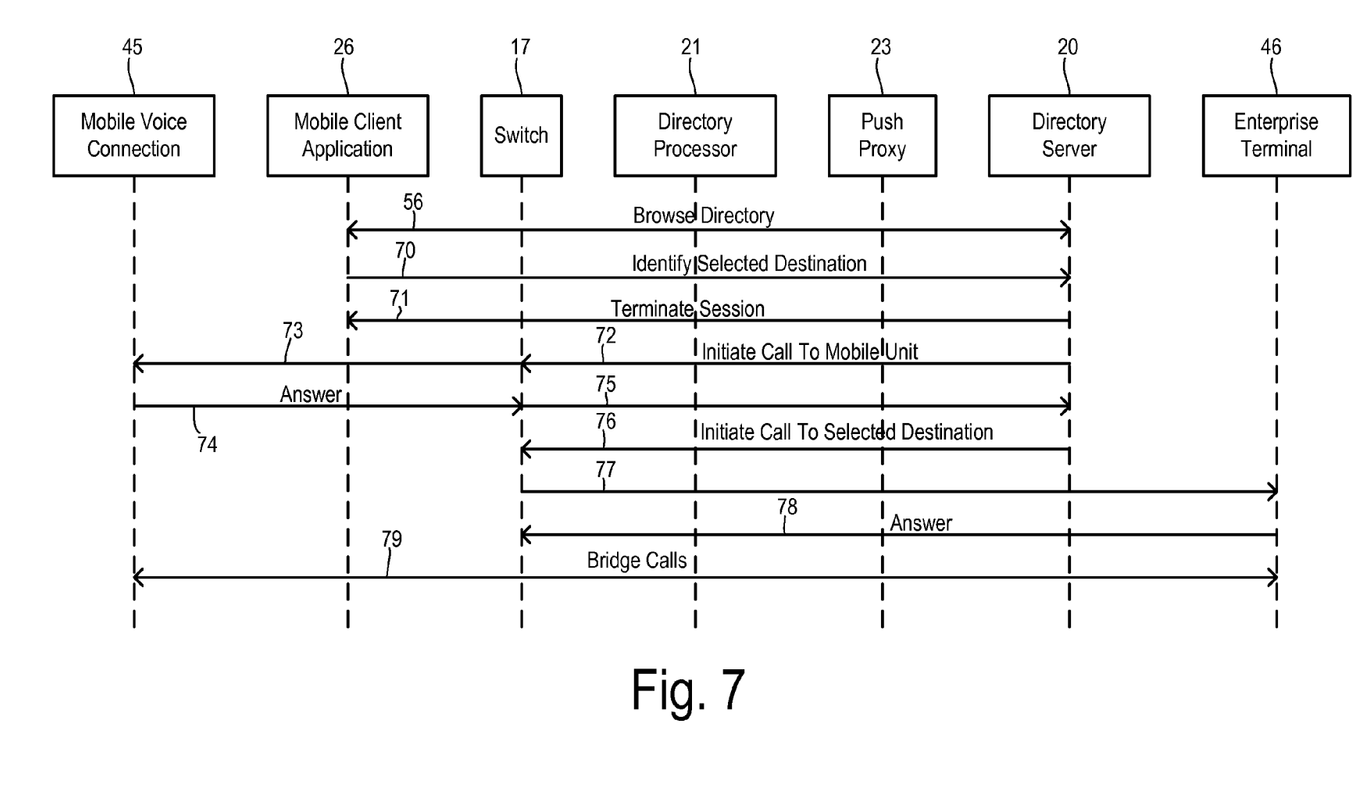
FIGS. 7-9 are signaling diagrams showing other preferred embodiments of the invention.

FIG. 7 is a signal flow diagram showing an alternative embodiment for establishing the voice call with the desired call destination once it is selected. Thus, after browsing the directory in transaction 56, the user chooses a call destination and the selected destination is identified to directory server 20 in transaction 70. Directory server 20 terminates the data session in transaction 71, and directory server 20 initiates a voice call to the mobile handset in transaction 72 by sending the telephone number of the mobile handset to switch 17. Switch 17 completes a voice call to the mobile handset in transaction 73. The user answers the call in transaction 74 and the switch signals a completed call to directory server 20 in transaction 75. Directory server 20 then initiates a call to the selected call destination by sending call setup information to switch 17 in transaction 76. Switch 17 sets up a call to enterprise terminal 46 in transaction 77. A ringing sound may be played to the user of the mobile handset. The person at the enterprise answers the call at transaction 78. After both calls are answered, switch 17 bridges the two calls in transaction 79 so that the user can conduct their desired voice call with the intended party at the enterprise.

Figure 8:
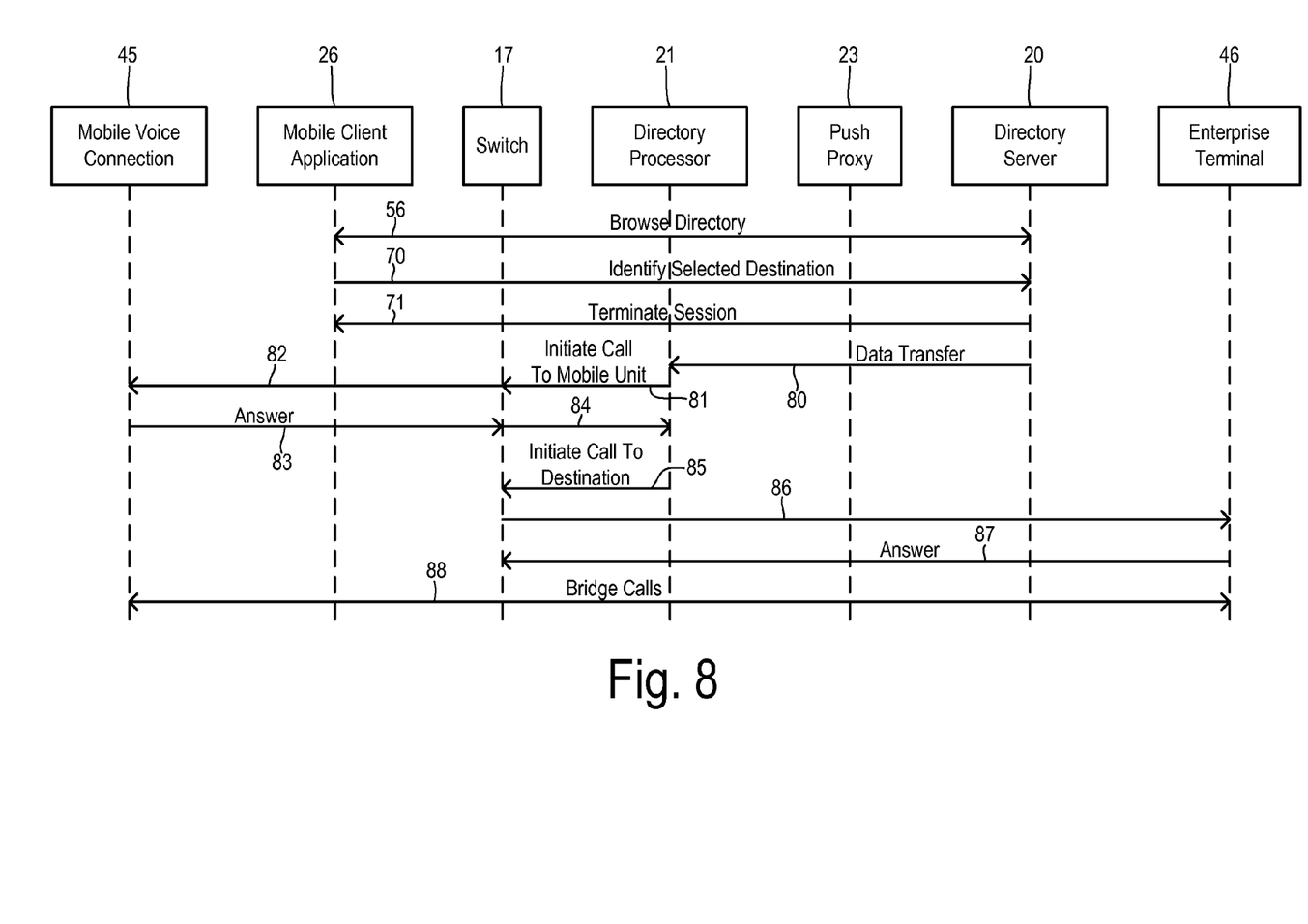

Another alternative for establishing the new voice call is shown in FIG. 8. After the user selected call destination is identified to directory server 20 in transaction 70 and directory server 20 has terminated the data session in transaction 71, dialing information is transferred from directory server 20 to directory processor 21 in transaction 80. In this embodiment, directory processor 21 performs a call process similar to the process used by directory server 20 in FIG. 7. Thus, directory processor 21 uses the dialing information transferred to it to initiate a call to a mobile handset in transaction 81. Switch 17 directs a call to the mobile handset voice connection 45 in transaction 82. The mobile handset rings and then the user answers the call in transaction 83. Confirmation of the answer is provided to directory processor 21 in transaction 84. A call to the selected call destination is then initiated by directory processor 21 in transaction 85. Switch 17 directs the call to enterprise terminal 46 in transaction 86, and the call is answered in transaction 87. Then switch 17 bridges the calls together in transaction 88.

Figure 9:
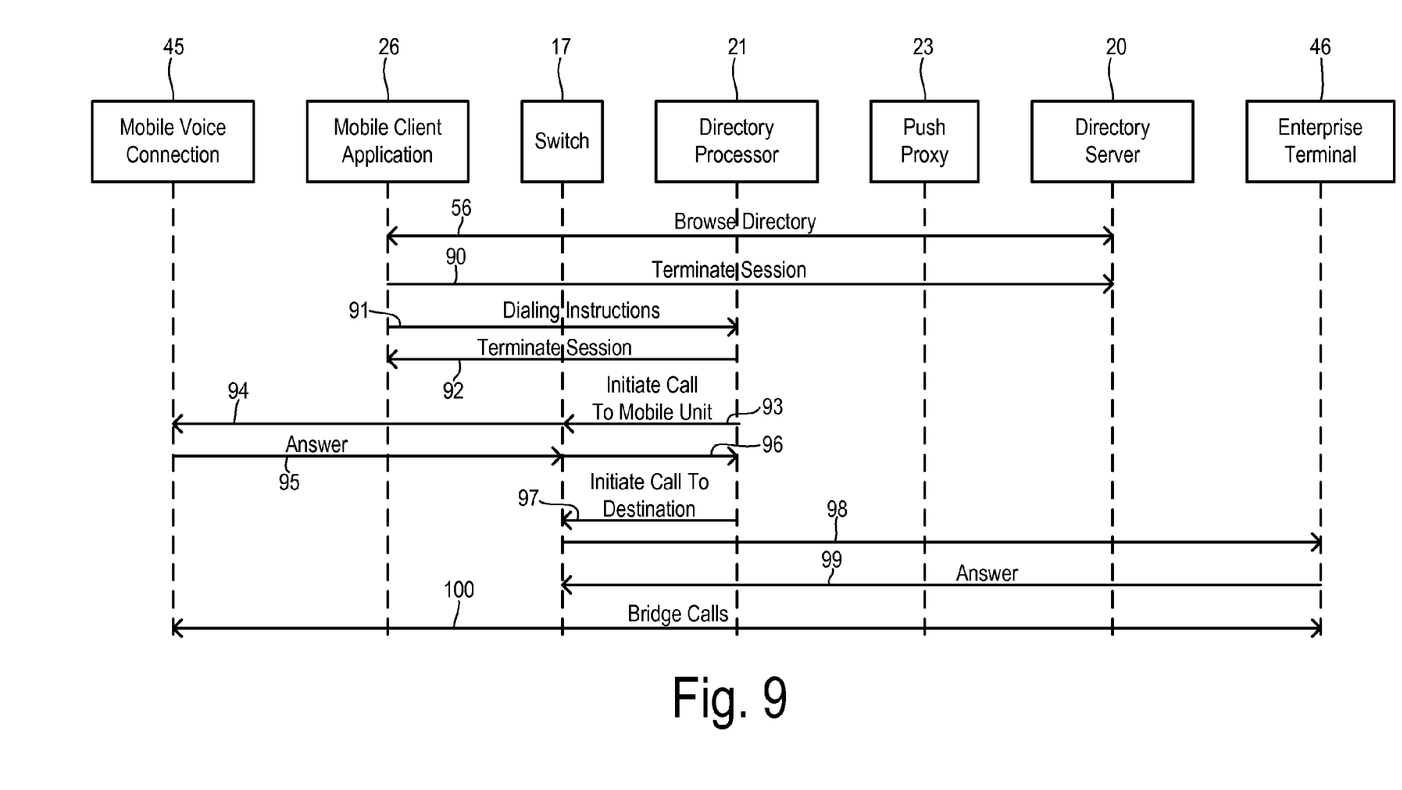

FIG. 9 shows a modified embodiment wherein the mobile client application 26 terminates the data session with directory server 20 in transaction 90 after obtaining the necessary dialing information. Mobile client application 26 sends dialing instructions to directory processor 21 in transaction 91. Then the data session is terminated in transaction 92. Based on the received dialing instructions, directory processor 21 completes separate calls to the mobile handset and the enterprise terminal and the calls are bridged together in transactions 93-100 similar to how it is performed in FIG. 8.

What is claimed is:

1. A system for displaying directory information on a mobile handset of a user, wherein the mobile handset engages in voice calls and data calls via a carrier network, the system comprising:
   a database of directory-capable telephone numbers;
   a directory processor coupled within the carrier network to receive a dialed telephone number when the user initiates a voice call from the mobile handset, wherein the directory processor checks whether the dialed telephone number appears in the database of directory-capable telephone numbers;
   a gateway coupled to the directory processor for pushing a data message to the mobile handset;
   a directory server having a data address that is included in the data message to the mobile handset, wherein the directory server stores directory information for a plurality of call destinations with respective destination identifiers and respective access rules corresponding to the directory-capable telephone numbers; and
   a client application in the mobile handset responsive to the data message pushed to the mobile handset for sending a request to the directory server via a data call, wherein the request identifies the dialed telephone number;
   wherein the directory server identifies relevant directory information based on the dialed telephone number and transmits the relevant directory information to the client application via the data call;
   wherein the client application displays the relevant directory information and the user selects a call destination; and
   wherein the data call is terminated and a new voice call is established between the mobile handset and the selected call destination.

2. The system of claim 1 wherein the directory-capable telephone number identifies an enterprise having a plurality of phone extensions, and wherein the relevant directory information includes phone extensions of the enterprise.

3. The system of claim 1 wherein the directory server is coupled within the carrier network.

4. The system of claim 1 wherein the directory server provides call set-up information to the mobile handset corresponding to the selected call destination, and wherein the mobile handset ends the data call and dials a new call based on the set-up information.

5. The system of claim 4 wherein the set-up information includes dial instructions for appending to the corresponding telephone number.

6. The system of claim 5 wherein the directory processor ignores a dialed telephone number when it has appended dial instructions.

7. The system of claim 1 wherein the directory server establishes the new voice call by bridging calls to the mobile handset and to the selected call destination.

8. The system of claim 1 wherein the directory processor establishes the new voice call by bridging calls to the mobile handset and to the selected call destination.

9. The system of claim 1 wherein the gateway is comprised of a push proxy gateway.

10. A method of providing directory information for display on a mobile handset that engages in voice calls or data calls via a carrier network, the method comprising the steps of:
    a user placing a voice call from the mobile handset via the carrier network by dialing a dialed telephone number, wherein the dialed telephone number corresponds to an enterprise having a plurality of call destinations;
    a directory processor within the carrier network receiving the dialed telephone number and querying a database to determine whether it corresponds to a directory-capable telephone number;
    if the dialed telephone number corresponds to a directory-capable telephone number, then the directory processor providing a data address for a corresponding directory server to a gateway;
    the gateway pushing a data message to the mobile handset including the data address for the directory server;
    the mobile unit establishing a data call with the directory server;
    the directory server identifying relevant directory information for the dialed telephone number and transmitting at least a portion of the relevant directory information to the mobile handset, wherein the relevant directory information includes respective destination identifiers and respective access rules of the call destinations corresponding to the directory-capable telephone numbers, and wherein the relevant directory information includes call set-up information for the call destinations;
the user selecting a desired call destination;
ending the data call; and
establishing a new voice call between the mobile handset and the desired call destination using the respective call set-up information.

11. The method of claim 10 wherein the step of establishing a new voice call comprises:
the mobile handset dialing the new voice call using call set-up information from the directory server.

12. The method of claim 10 wherein the step of establishing a new voice call comprises:
the directory server establishing a first voice call with the mobile handset;
the directory server establishing a second voice call with the desired call destination; and
bridging the first and second voice calls.

13. The method of claim 10 wherein the step of establishing a new voice call comprises:
the directory processor establishing a first voice call with the mobile handset;
the directory processor establishing a second voice call with the desired call destination using call set-up information from the directory server; and
bridging the first and second voice calls.

14. The method of claim 10 wherein the step of establishing a new voice call comprises:
the directory processor establishing a first voice call with the mobile handset;
the directory processor establishing a second voice call with the desired call destination using call set-up information from the mobile handset; and
bridging the first and second voice calls.

15. The method of claim 10 wherein the directory processor responds to a dialed telephone number having appended dial instructions as not being a directory-capable telephone number.

* * * * *